United States Patent [19]
Von Brandt et al.

[11] Patent Number: 4,964,941
[45] Date of Patent: Oct. 23, 1990

[54] APPARATUS FOR MOUNTING A MAGNETIC HEAD ON A SUSPENSION ARM

[75] Inventors: Kim Von Brandt, Boulder; Bruce L. Blakeslee, Golden; John Keil, Jr., Lakewood; Robert D. Stroud, Boulder, all of Colo.

[73] Assignee: Storage Technology Corporation, Louisville, Colo.

[21] Appl. No.: 394,569

[22] Filed: Aug. 16, 1989

Related U.S. Application Data

[62] Division of Ser. No. 221,673, Jul. 20, 1988, Pat. No. 4,866,836.

[51] Int. Cl.$^5$ .............................................. B32B 31/12
[52] U.S. Cl. ..................................... 156/360; 29/407; 29/603; 29/701; 29/759; 156/64; 156/378; 156/379.8; 156/556; 156/580.1
[58] Field of Search ................. 29/603, 407, 759, 701; 360/103, 104; 156/64, 379.8, 556, 378, 360, 580.1

[56] References Cited

U.S. PATENT DOCUMENTS 4,391,035 7/1983 Van de Bult ........................ 29/603

Primary Examiner—Carl E. Hall
Attorney, Agent, or Firm—Dorr, Carson, Sloan & Peterson

[57] ABSTRACT

A method and apparatus for positioning a magnetic read/write head with precision orientation on a suspension assembly arm. The arm contains a plurality of mounting indicia. Computer controlled apparatus, including an optics system, scans the mounting indicia and the head and mounts the head on a predetermined desired location on the arm and with the desired orientation.

9 Claims, 8 Drawing Sheets

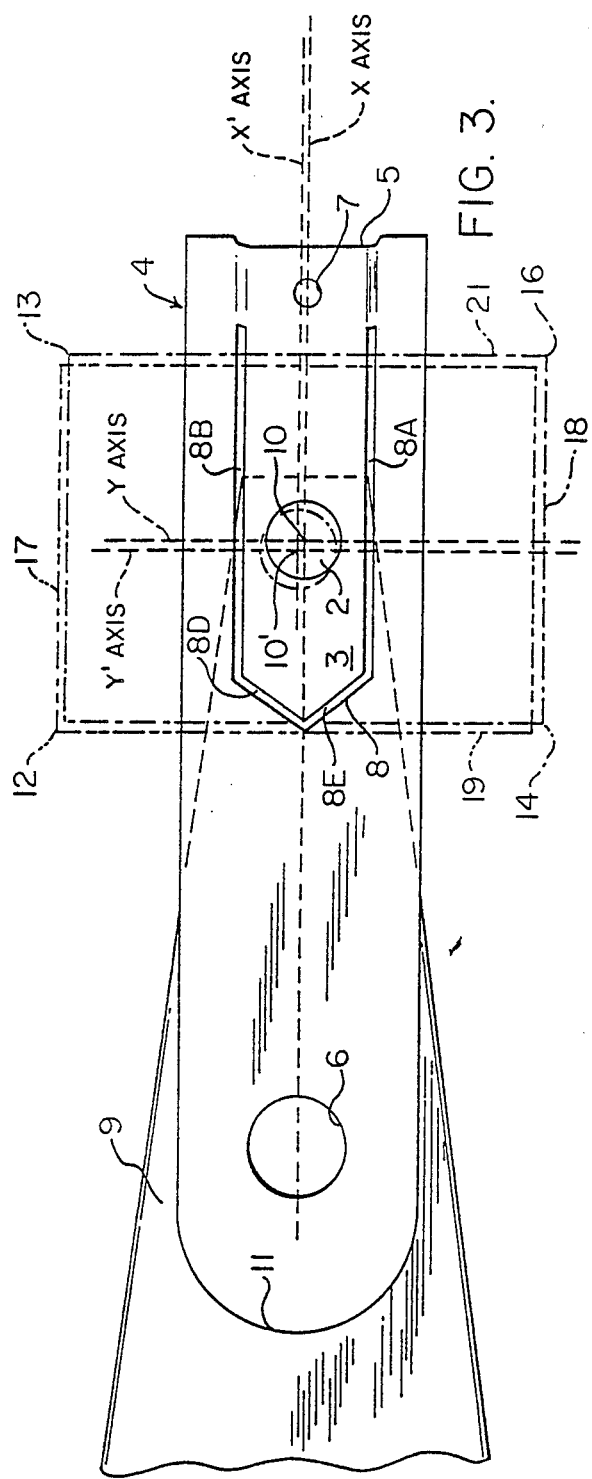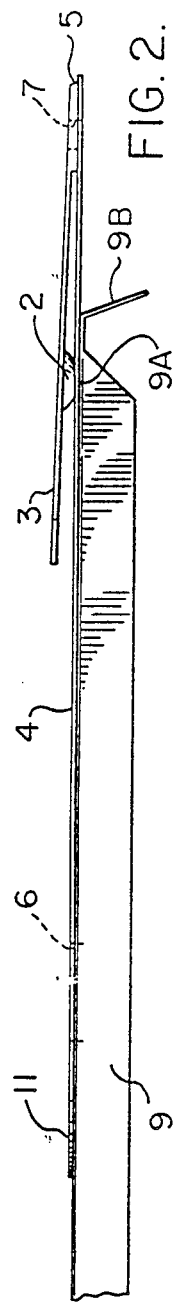

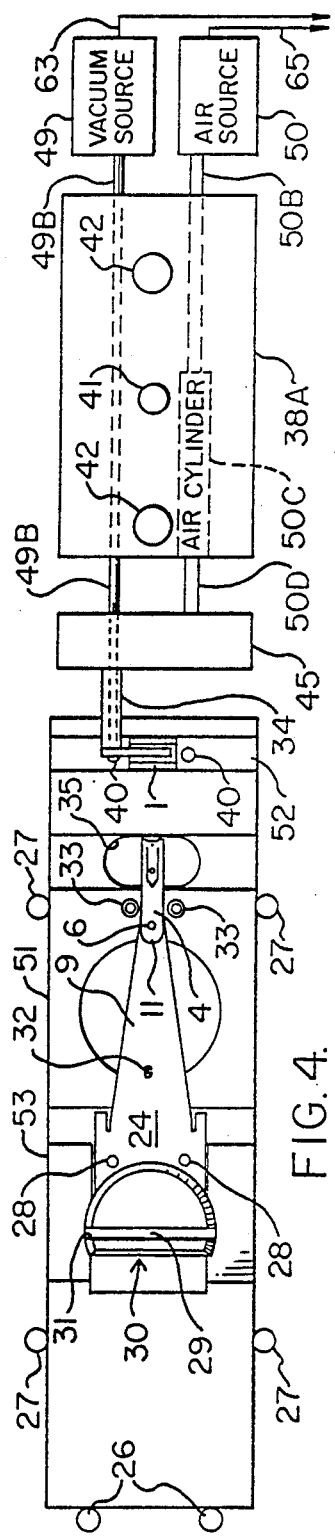
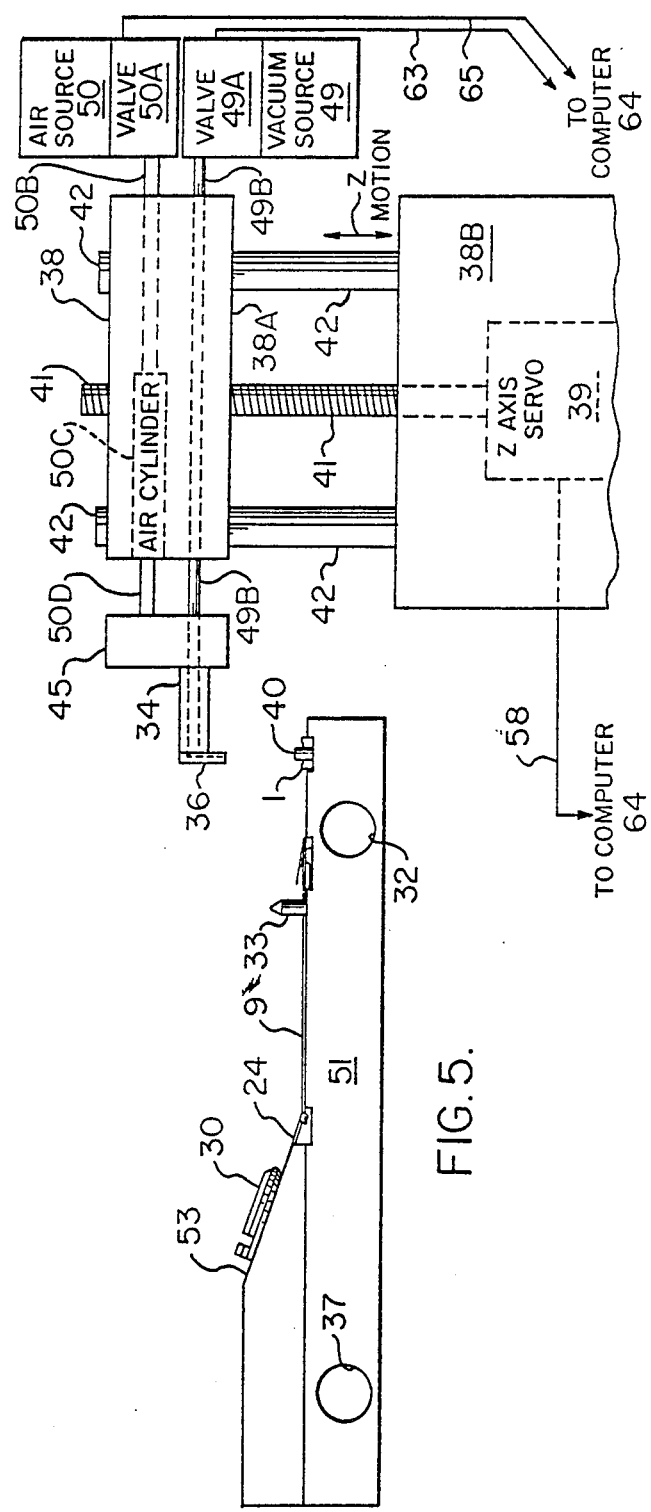
FIG. 4.
FIG. 5.

CONTINUE TO FIG. 9.

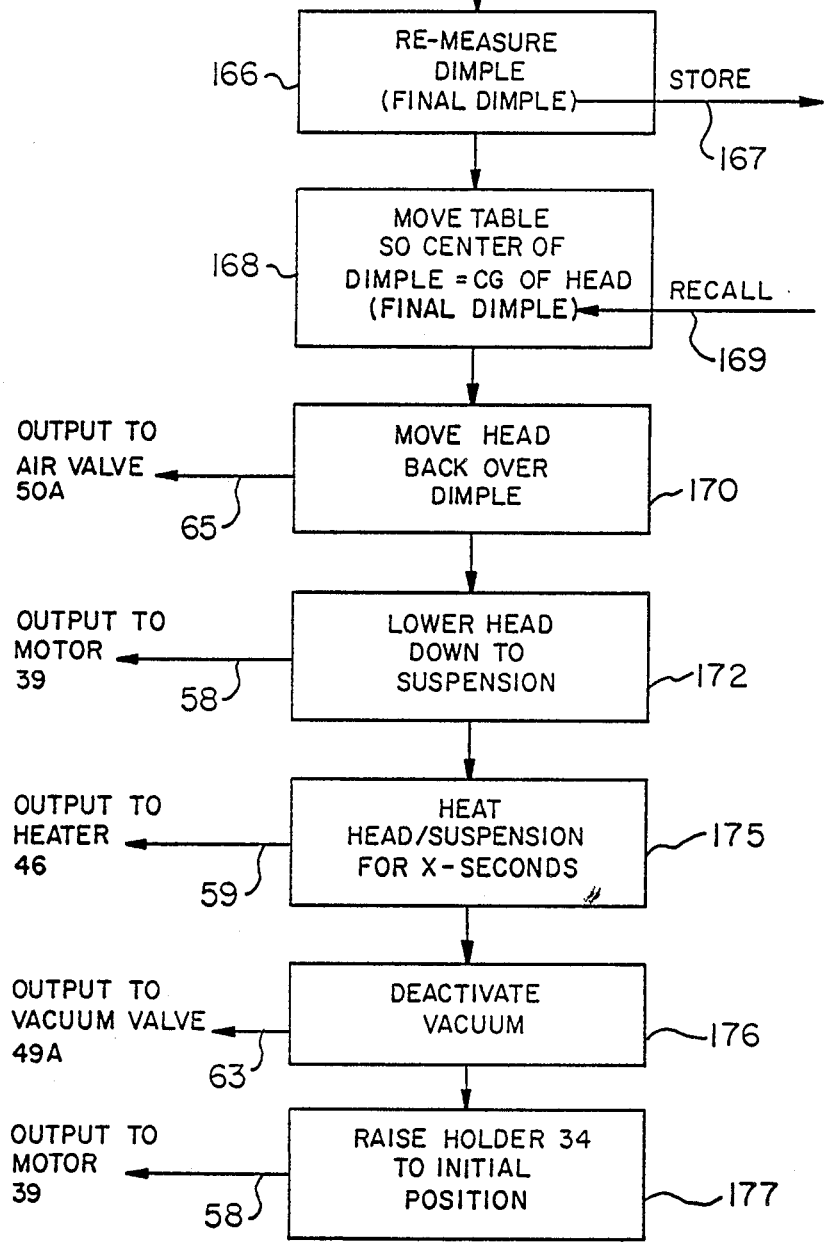
FIG. II.

APPARATUS FOR MOUNTING A MAGNETIC HEAD ON A SUSPENSION ARM

This is a divisional of application Ser. No. 07/221,673, filed July 20, 1988, now U.S. Pat. No. 4,866,836.

FIELD OF THE INVENTION

This invention relates to a magnetic read/write head and, in particular, to apparatus for and a method of mounting a magnetic read/write head with improved precision on a suspension assembly arm.

BACKGROUND OF THE INVENTION

Magnetic read/write heads are extensively used in computers and other applications in which data is written onto and read from a magnetic medium such as a magnetic tape or disk. In such applications, the magnetic head is mounted onto a suspension assembly arm which is computer controlled so that the head may be rapidly moved from position to position to write or read information from the portion of the medium specified by the computer.

The magnetic heads must be moved as rapidly as possible over the associated magnetic medium in order to minimize the time required for locating the correct track that is to be read or written. This rapid movement often produces acceleration and deceleration forces on the head in the order of 40 gs. Magnetic disks are manufactured with an extremely high degree of flatness. The magnetic heads float on a very thin film of air just above the disks. Each magnetic head is secured to a resilient suspension assembly arm in order to obtain the mobility which permits the head to float on the air film and to provide a resilient load which exerts an accurately defined pressure on the head. In some usages, a plurality of disks and associated heads are used to provide extra data storage capacity. In order to minimize the external dimensions of these storage devices, the disks are typically arranged as closely as possible to each other. The suspension arm and associated heads therefore are spaced between two magnetic disks and should be as flat as possible and operate as close as possible to the surface of the disk with which each head cooperates. It is obvious that the suspension arm should never touch the magnetic disk surface because this would render the disk unserviceable.

The current trend in the industry is towards higher and higher areal recording densities and an ever increasing numbers of tracks on the associated disks. This has led to increased miniaturization of all parts of the recording apparatus including the heads and the apparatus to which the heads are attached. As a result, thin film heads are currently used that have dimensional tolerances in the order of several millionths of an inch. This requires that the heads be accurately positioned on the associated suspension arm so that the head may operate parallel to the plane of assembly arm as well as the plane of the disk with which it is to exchange data. In practice, the head must be positioned parallel to the plane of the disk within several thousandths of an inch in each dimension. The head must also have a minimal rotational error with respect to the magnetic orientation of the data to be read. The head must be separated from the moving disk by no more than several millionths of an inch.

It can be seen from the above that the positioning of a head on a suspension arm is extremely critical regarding the tolerances that must be achieved if the optimum operation of the head is to be achieved. The close tolerances and accurate positioning requires that heads be positioned with extreme precision on suspension assembly arms during the fabrication operation of these elements.

It is presently a problem to position heads with the required precision on suspension assembly arms. The typical procedure used to affix a head to a suspension arm is to position the suspension arm in a first tool holder. The head is placed in a second tool holder and the two tool holders are then moved a controlled manner so that the end of the suspension arm and the head are brought together with the required orientation. The head is then permanently affixed to the end of the suspension arm by use of a suitable adhesive or the like. This procedure has inherent problems since the accuracy by which the head is positioned on the arm is dependent upon a number of variables. These include, the dimensional accuracy of the head, the accuracy of the tool that holds the arm, the accuracy of the tool that holds the head, the accuracy of the apparatus that moves the head over the arm, and finally the accuracy of the apparatus that lowers the head onto the arm. In this positioning operation, it is necessary that the geometric center of the head be positioned with precision over a predetermined point on the assembly arm with an error of no more than plus or minus one mill in any direction and with an error of only several minutes of a degree with respect to the rotational position of the head with respect to the plane of the top surface of the assembly arm. Although the design objectives are plus or minus one mill, in a typical production line, there can be an error of five mills due tolerances of the head and the apparatus used to position the head on the suspension arm. An error of in excess of two mills can cause operational problems that require head-arm assemblies having errors in excess of this amount to be discarded.

It can therefore be seen that it is currently a problem to affix a magnetic head with the required precision on suspension assembly arm so that the head will have the correct orientation with respect to the disk with which it is to exchange data.

SUMMARY OF THE INVENTION

A solution to the above problem and a technical advance in the art is achieved by the present invention which provides an improved method and apparatus for accurately mounting a magnetic head onto a suspension assembly arm. The method of the present invention uses a computer controlled optics system to determine the location of the geometric center of the head and as well as the exact situs on the suspension assembly arm on which the head is to be mounted. The computer then controls the apparatus which mounts the head in the correct location on the arm and with the correct orientation.

The arm is fabricated with a pair of marking holes in accurately determined locations near the location on the arm to which the head is to be mounted. The location on the arm to which the head is to be positioned is intermediate the two marking holes and is identified by a downwardly projecting dimple that is formed in the arm at the time the arm and the two marking holes are formed. The center of the dimple is the point of the suspension arm onto which the center of the head must be positioned when the head is attached to the arm.

At the beginning of the assembly operation in which the head is affixed to the arm, both the head and the arm are placed on a tool holder that holds the arm and the head in an initial spaced apart relationship. The tool holder need have only nominal accuracy since the precision with which the head is mounted onto the arm by the process of the present invention does not depend upon critical dimensional tolerances of the tool holder or of the arm or the head. The tool holder with the arm and head held in a spaced apart relationship is positioned under a microscope of the computer controlled optics system. The optics system scans and identifies the exact location of the two marking holes and the dimple. During this scanning operation, the optics system computes the situs of the centers of the two holes and the dimple. The optics system then defines an imaginary line connecting the centers of the two marking holes. This line may be considered to be an x axis which runs longitudinally the length of the assembly arm. The optics system next determines the amount by which this x axis of the arm is offset from a horizontal reference line on a table comprising a part of the vision system and on which the tool holder containing the arm and the head rests. The x axis of the arm and the horizontal reference line of the table should ideally be parallel to each other. However, in most cases the x axis of the arm deviates from being parallel with the horizontal reference line of the table by a small angle termed theta 1. The optics system determines this angle theta 1 as well as the amount by which the x axis of the arm is offset from the horizontal reference line of the table.

The optics system also identifies the situs of the center of the dimple intermediate the two marking holes. Ideally, the center of the dimple should be at a predetermined point on the x axis interconnecting the centers of the two marking holes. However, as a result of manufacturing tolerances, the dimple is often offset slightly from its ideal position. The amount by which the center of the dimple is offset vertically from the x axis is referred to as the x' offset. The amount by which the center of the dimple is offset horizontally from its ideal location is referred to as the y' offset.

At this point in the process, the computer controlled optics system has identified the x axis of the assembly arm, has determined the amount by which the x axis is offset from the horizontal reference line of the table and has determined the angular amount theta 1 by which the x axis is offset from being parallel to the horizontal reference line of the table. The computer controlled optics system has also identified an x' and y' offset for the dimple representing the amount by which the actual center of the dimple is offset from its idealized location of the dimple on the x axis of the arm.

The optics system next scans the head, which is rectangular, in order to compute the situs of its geometric center. It does this by a technique in which the four corners of the head are scanned and identified. Also, from a scanning of the two bottom corners of the head, the computer determines the amount by which the bottom end of the head, as defined by a line interconnecting the two bottom corners, is offset from being parallel to the horizontal reference line of the table. This angular amount is defined to be an angle of theta 2. The head is next picked up and moved laterally by a moveable arm controlled by the computer. The table on which the tool holder rests is then rotated in a horizontal plane by an angular amount representing the difference between the angle theta 1 and theta 2. Recall that theta 1 is the angular amount by which the x axis of the arm deviates from being parallel to the horizontal reference line of the table. Angle theta 2 is the amount by which the bottom end of the head deviates from being parallel to the horizontal reference line of the table. For example, if theta 1 is three degrees and theta 2 is two degrees, the table is rotated one degree in order to position the x axis of the arm and so that it is parallel to the bottom end of the head which is temporarily being held by the moveable arm.

The computer controlled optics system next uses the various parameters it has measured to move the table and the arm so that the center of the dimple is moved to the position in which it must be to receive center of the head. These parameters include the amount by which the x axis of the arm is offset from the horizontal reference line of the table and the x' and y' variables which represent the amount by which the center of the dimple is offset from its idealized location on the x axis of the suspension arm. The optics system next scans the dimple again and to determine whether the center of the dimple actually is in the position it now should now be in. If the dimple is still offset from its idealized location, the table is moved in the appropriate direction so as to position the center of the dimple exactly where it needs to be to receive the head. Next, the moveable arm holding the head is moved horizontally so that the center of the head is once again over the center of the dimple. The moveable arm and the head is then lowered so that the center of the head is placed onto the suspension arm over the center of the dimple. The suspension arm has been provided with drops of glue adjacent the dimple in a prior assembly operation. Heat is then applied to the bottom of the dimple for a brief interval to bond the adhesive and rigidly affix the head to the suspension assembly arm.

This completes the assembly operation and at this time the center of the head is affixed to the idealized location on the arm. The suspension positioning of the head is accurate with regard to rotational errors since the table was rotated so that the x axis of the suspension arm is parallel to the bottom end of the head. The computer controlled optics system ensures that the read/write surface of the head is positioned so that the head will be exactly parallel to the surface of the magnetic medium with which its will subsequently cooperate. The method of the invention positions the head on the arm accurately with tolerances that were heretofore unattainable by prior methods and which permit the head to operate in a trouble free manner with the disk with which it will subsequently be associated. The method of the present invention thereby overcomes and solves the above discussed problems of accurately mounting magnetic heads on suspension arms.

DESCRIPTION OF THE DRAWING

These and other aspects of the invention may be better understood from a reading of the following description thereof taken in conjunction with the drawing in which:

FIG. 2 is a side view of the assembly arm of FIG. 1;

FIG. 3 illustrates the placement of head onto a dimple on the assembly arm of FIG. 1;

FIG. 4 is a top view of a tool holder containing an assembly arm and a head as well as the apparatus that moves the head;

FIG. 5 is a side view of the apparatus of FIG. 4;

FIGS. 8, 9, 10 and 11 illustrate the commands that are applied to the computer in accordance with the method of the invention.

DETAILED DESCRIPTION

Figure 1:
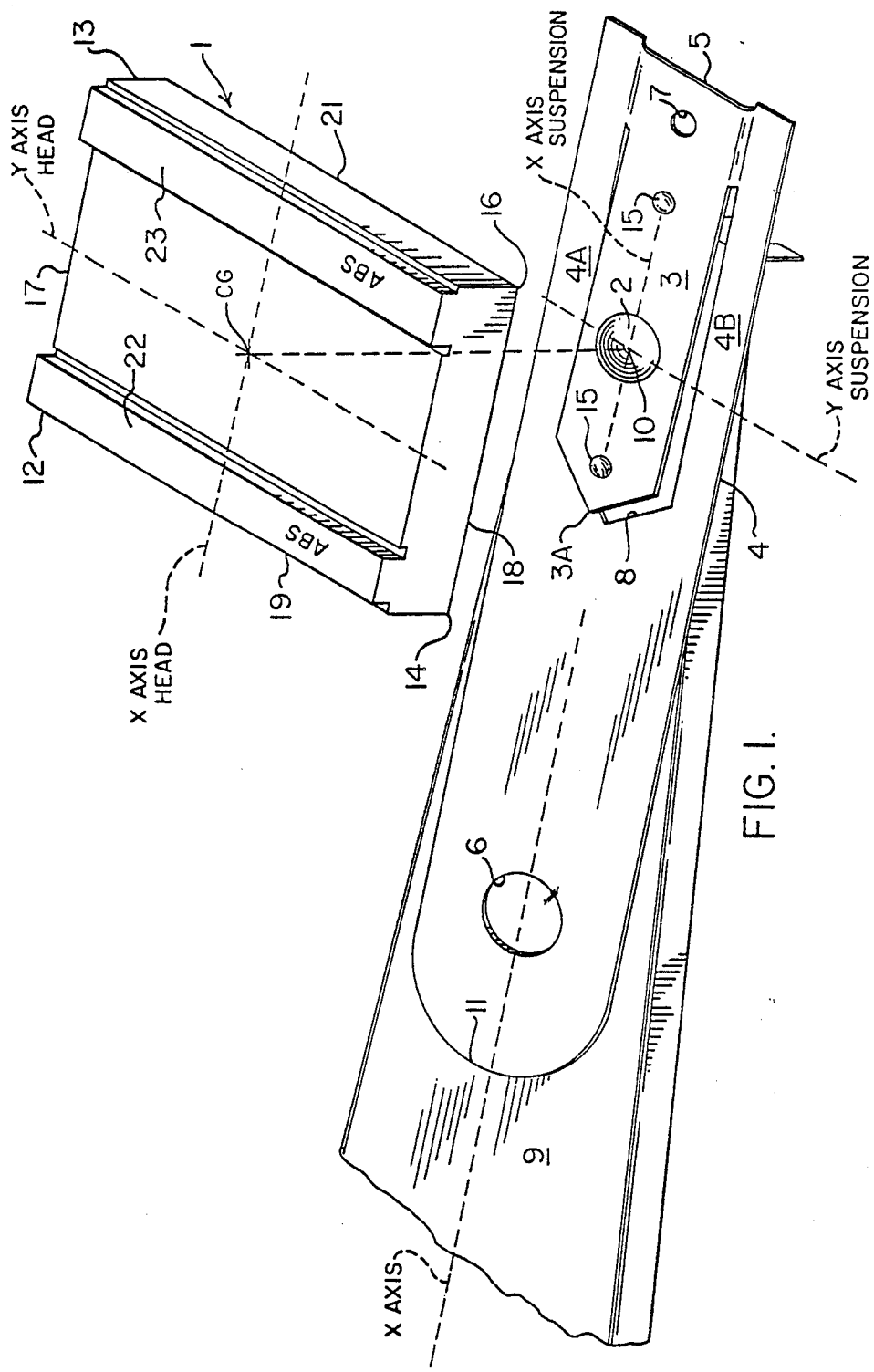
FIG. 1 illustrates a magnetic head positioned over a suspension assembly arm.

FIG. 1 discloses a magnetic head 1 positioned over a dimple 2 stamped in the end portion 4 of a suspension assembly arm 9. Head 1 is positioned so that its center of gravity cg is over the center 10 of the dimple 2. The method and apparatus of the invention positions the center of head 1 over the center of dimple 2 with the correct orientation of all aspects of the head. The process of the invention lowers head 1 onto element 4 and its flexure 3 in the correct orientation and then rigidly affixes head 1 to element 4 by means of an adhesive bonding operation.

End element 4 comprises an outer end 5, a small marking hole 7, a large marking hole 6, and a semicircular end portion 11. Element 4 is spot welded to arm 9 in the general vicinity of end 11 of element 4. Element 4 basically comprises a flat thin strip of metal which is fabricated to have a flexure 3 containing the circular dimple 2 and a pointed left end 3A. A void 8 extends around the perimeter of flexure 3 except at its right hand portion 5. Flexure 3 contains drops of adhesive 15 on each side of dimple 10. The magnetic read/write head 1 is rectangular and has corners 12, 13, 14 and 16. These corners define an upper end 17 as shown on FIG. 1, a lower end 18, a left side 19 and a right side 21. A top left segment 22 and a top right segment 23 comprise the air bearing surfaces (ABS) of the head and contain the windings and gap of the portion of element 1 comprises the reading and writing elements of the head.

Head 1 is placed in the position as shown in FIG. 1 by the apparatus and method of the present invention. At this intermediate stage of the process, the lower end 18 of the head is parallel to the x axis of arm 9. This x axis is an imaginary line drawn between the centers of holes 6 and 7. This parallelism between the x axis of arm 9 and the lower end 18 of head 1 is accomplished by rotating arm 9 horizontally the required amount while head 1 remains stationary as subsequently described. After arm 9 is rotated to achieve this parallelism, the arm 9 and head 1 are moved to the position shown in FIG. 1 so that the center of gravity cg of head 1 is immediately over the center 10 of dimple 2. The final step of mounting head 1 to the center 10 of dimple 2 is to lower head 1 over dimple 2 and onto flexure 3 and then to join the head and the flexure by an adhesive bonding operation. Bonding is achieved by drops of adhesive 10 on flexure 3.

FIG. 2 is a side view of suspension arm 9 and its end element 4 of FIG. 1. Shown in further detail on FIG. 2 is dimple 2 which extends downwardly from flexure 3. The bottom most portion of the dimple rests on surface 9A of element 9 and between elements 4A and 4B (FIG. 1). The downward projecting right end 9B of arm 9 serves no function relevant to the invention.

FIG. 3 illustrates the mounting of head 1 on flexure 3 under two different assumed conditions. The first assumed condition is that the center 10 of the dimple 2 is located on correct location of the x axis of element 4. The second assumed condition is that the center 10 of dimple 2 is offset slightly to the left and slightly above its ideal location. End member 4 is spot welded near its left end portion 11 to the end portion of assembly arm 9 as shown on FIGS. 1 and 2. The left marking hole 6, the right marking hole 7, the flexure 3 and the dimple 9 are formed in element 4 prior to the spot welding operation. At that time, flexure 3 containing the dimple 2 is formed and sufficient material is removed by a stamping operation to form the void 8 between element 4 and the left end of flexure 3 has dimple 2 and the pointed left end segments 8D and 8E as well as a lower horizontal segment 8A and an upper horizontal segment 8B. The void 8 permits flexure 3 to function as a spring that is pivoted on its right end 5 which forms a part of element 4. The bottom of dimple 2 rests on the top surface 9A of arm 9 and acts as a gimbal for head 1 after it is attached to the dimple.

The first stage in the process of the present invention is for the computer controlled vision system subsequently described in connection with FIGS. 6 to scan sequentially the left marking hole 6, the dimple 2, and the right marking hole 7. During this scanning operation, the vision system computes the location of the geometric centers of hole 6, hole 7, and dimple 2. The vision system next draws an imaginary line between the computed centers of holes 6 and 7. This imaginary line is the x axis of suspension arm 9. The vision system next determines the amount by which the x axis of arm 9 is offset from an imaginary horizontal reference line stored in the data base of the computer portion of the vision system. The computer also determines the amount by which the x axis of arm 9 deviates from being parallel to the horizontal reference line stored in the computer. The amount by which the x axis of arm 9 deviates from being parallel is termed angle theta 1.

The center 10 of dimple 2 should ideally be on at a predetermined location on the x axis of arm 9 between the centers of holes 6 and 7. It may sometimes occur in the stamping operation in which element 4 is formed that dimple 2 will be in this idealized location. In such cases, the center of dimple is located at location 10 shown on FIG. 3. This idealized dimple is shown by the solid circular line on FIG. 3. It is then the task of the apparatus and method of the present invention to determine the location of the center of gravity of head 1 and positioned it over and affixed it to the center 10 of the idealized dimple 2. However, due to tolerances associates with any manufacturing operation, the center of the dimple 2 will usually be offset a slight amount from its idealized location 10. This situation is shown on FIG. 3 for the dimple shown by dotted lines and having the center 10'. This dimple is slightly above and is slightly to the left of the dimple at the idealized center 10. The method of the present invention detects this offset of dimple 2 and places the center of gravity of a head 1 over the center 10' of the offset nipple.

After having scanned holes 6 and 7 and having defined the x axis of arm 9, the computer controlled optics system scans the dimple and determines the situs of its center. In so doing the computer determines that the center of the dimple is in an offset location 10'. The location 10' is specified to be on a horizontal axis termed x' which is offset vertically with respect to the x axis of arm 9. Location 10' is further specified to be on a vertical axis y' which on FIG. 3 is offset to the left with respect to the y axis of the idealized center dimple.

FIGS. 4 and 5 discloses further details of the apparatus provided in accordance with the method of the invention. Shown on FIGS. 4 and 5 are a tool holder 51 and computer controlled z-motion apparatus 38 having element 38A and 38B. As is subsequently described in detail, tool holder 51 holds suspension arm 9 and head 1 in an initial spaced apart relationship. Tool holder 51 cooperates with z-motion apparatus 38 so that the head 1 may be affixed to the center of flexure 3 in the precise orientation required for the head to operate successfully as part of the apparatus of which it will be a part. The right side of tool 51 holds head 1 in a transversely positioned groove 52. Head 1 is held only with reasonable precision within recess 52 by retainer posts 40. On the left side of tool 51, suspension arm 9 is held with only reasonable accuracy in a predetermined position. Posts 33 hold the end segment 4 of arm 9 with reasonable accuracy so that the dimple 2 is in the mid portion of opening 35 in tool 51. Opening 35 extends vertically through tool 51 and permits air from a heat source (shown on FIGS. 6 and 7) to be applied to the bottom of dimple 2 at the end of the assembly operation when it is desired to bond an adhesive to hold head 1 to flexure 3.

Suspension assembly arm 9 includes an upwardly tilted segment 24 on its left end as shown on FIG. 5. Segment 24 rests on upwardly tilted segment 53 of tool holder 51. A semicircular holding element 30 is rotatable about its center 29 by means of a groove 31 so that it may be rotated to the position shown on FIGS. 4 and 5 to project outwardly over the upward extremity of segment 24 of arm 9 to hold the left portion of the arm with reasonable accuracy in a predetermined position. Mounting posts 26 and 27 comprise a part of a table on which tool 51 rests and these posts hold the tool 51 with reasonable accuracy on the table.

The z-motion apparatus 38 cooperates with tool holder 51 to position head 1 accurately onto flexure 3. On FIGS. 4 and 5, arm 34 projects outwardly to the left from z-motion apparatus 38 so that its downward projection 36 (FIG. 5) is over head 1. The z-motion apparatus includes an upper movable part 38A and a lower stationary base part 38B. Part 38A is moveable with respect to the base 38B by means of a threaded element 41 which is rotatable to move element 38A either upwardly or downwardly on vertical guides 42. The z axis servo motor 39 is controllable to rotate threaded element 41 so that upper element 38A moves either upwardly or downwardly. Vacuum source 49 is controllable by valve 49A and computer 64 (FIG. 6) to apply vacuum to a hole in the bottom end of projection 36 of arm 34. Servo motor 39 controls the vertical position of element 38A. Arm 34 can move horizontally to the right or the left under control of air cylinder 50C. Cylinder 50C is controlled by air source 50 and air valve 50A. Arm 34 is shown in its leftmost position on FIGS. 4 and 5 and at this time, the downward projection 36 of arm 34 is over head 1.

It is required at certain times in the process of the present invention that arm 34 move downwardly so that its downward projection 36 can pick up the head 1. Servo motor 39 is then energized and rotates screw 41 in the direction required to lower element 83A and arm 34 so that its downward projection 36 is adjacent the top surface of head 1. Vacuum value 49A next is actuated to create a vacuum via line 49B and 49D at the bottom of element 36. Since the bottom of element 36 is adjacent the top surface of head 1, the vacuum causes head 1 to be picked up and held to the bottom of element 36. After head 1 is picked up, servo motor 39 and the screw 41 are operated in the direction required to raise element 38A and its arm 34. This moves head 1 upward and away from the top surface of tool 51. Cylinder 50C is actuated so that arm 34 and the attached head 1 are moved to the right.

Subsequently in the process, arm 34 is moved once again to the left by cylinder 50C. The table (FIGS. 6 and 7) on which tool 51 rests is moved controllably to the right under the control of a computer so as to position the center of dimple 2 under the center CG of head 1 which remains affixed to the bottom of projection 36. Servo motor 39 and the screw 41 are again operated in the direction required to lower head 1 onto dimple 2. Flexure 3 is supplied with small drops of adhesive 15 (FIG. 1) prior to the step of the process portrayed in FIGS. 4 and 5. A heat source 46 (FIGS. 6 and 7) is actuated and blows air upwards through hole 35 against the bottom surface of the dimple 2. Flexure 3 and adhesive 15 is now in contact with the bottom surface of head 1. The adhesive 15 is of the type that bonds rapidly when heat is applied to it. The heat source remains actuated for the time required to bond the adhesive sufficiently so that when the heat source is deactivated, the head remains affixed to flexure 3 in the desired position and orientation.

Figure 6:
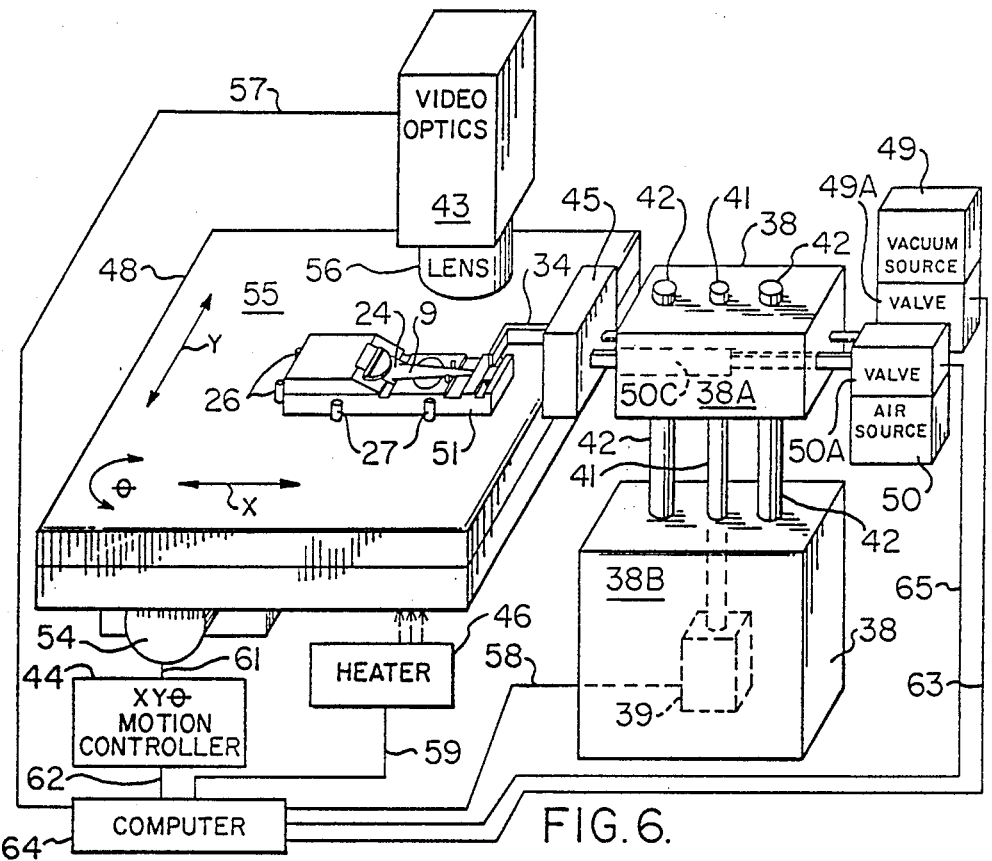
FIG. 6 is an perspective view of the apparatus used in accordance with the present invention.
Figure 7:
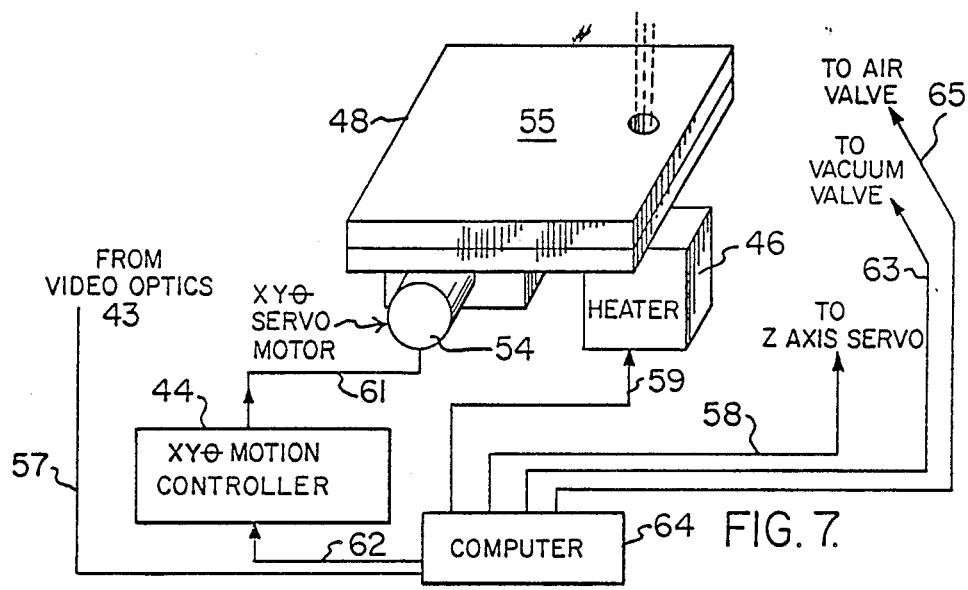
FIG. 7 illustrates further details of the apparatus of FIG. 6.

FIGS. 6 and 7 show further details of the apparatus used to practice the method of the present invention. Tool holder 51 rests on a top surface 55 of table 48. Tool holder 51 is held with nominal accuracy in a predetermined position on table 48 by upwardly projecting posts 26 and 27. The position of table 48 is controllable in an x and y direction by means of servo motor 54 and motion controller 44. Motor 54 may comprise three separate motors. With respect to FIGS. 6 and 7, table 48 can move to the right or to the left as well as backwards and forwards. Also, the table can be rotated horizontally by servo motor 54.

Tool holder 51 and suspension arm 9 and head 1 are shown positioned under a video optics system 43 having a lens element 56 which may be focused under control of computer 64 via path 57. Computer 64 and the video optics 43 comprises a sophisticated software controlled video robotic system. Computer 64 and servo motor 54 cause the position of table 48 to be controlled so that tool 51 can move in a controlled manner with respect to lens 56. This permits lens 56 and video optics 43 to scan various portions of the assembly suspension arm 9 as well as head 1. The positioning post 26 and 27 cause the tool holder 51 to be positioned on the table so that the arm 9 and head 1 are initially in the general vicinity required for these elements to be scanned by lens 56.

The following describes the manner in which the elements shown on FIGS. 6 and 7 cause head 1 to be positioned with precision onto dimple 2.

At the beginning of the process, head 1 and suspension arm 9 are in spaced apart positions on tool 51. The process begins when tool 51 containing suspension arm 9 and head 1 is positioned as shown on FIGS. 6 and 7 so that head 1 and arm 9 are generally in the vicinity of the working area of lens 56. At this time, tool holder 51 is positioned so that the working area of the lens is slightly to the left of marking hole 6 shown in better detail on FIGS. 1 and 2. Next, table 48 and tool holder 51 are to move to the left by servo motor 54 so that lens 56 and video optics 43 sequentially encounter hole 6, dimple 2, and hole 7. The video optics system 43 working in conjunction with computer 64 has the capability of identifying predetermined geometrical patterns such as circles and rectangles. It also has the capability of computing the center of a circle by scanning a left hand and a right hand circumferential segment of the circle. Thus, computer 64 and the video optics 43 now scan and compute the exact location of the center of circle 6, circle 7, and dimple 2.

Computer 64 next defines the x axis of arm 9 shown on FIGS. 1 and 3. The x axis is an imaginary line connecting the computed centers of holes 6 and 7. The computer 64 also contains information regarding an imaginary horizontal reference line which runs from left to right on FIG. 6 and which may be considered to be a horizontal reference on table 48. This horizontal reference may be anywhere on the top portion 55 of table 48 and its particular location is unimportant and irrelevant. However, generally, the horizontal reference may be assumed to be parallel to the direction in which the table top is moved when servo motor 54 effects a left/right movement of the table. Having determined the location of the x axis of arm 9, computer 64 next determines the distance by which the x axis is offset from the horizontal reference of the table. It also determines an angle theta 1 which represents the angular amount by which the x axis the arm 9 is offset from being parallel with the horizontal reference of table 48. This information is stored in computer 64 for subsequent use.

Next, computer 64, having determined the exact location of the center 10 of the dimple 2, determines the amount by which the center of the dimple is offset from the idealized center of the dimple on the x axis of arm 9 as shown on FIG. 3. As priorly discussed, let it be assumed that the design objective for element 4 specifies that location 10 on FIG. 3 is the center of an ideally located dimple. However, due to tooling and other errors, many elements 4 will have the dimple positioned so that there is a small offset between the actual center 10' of the dimple and the center 10 specified in the design objective. Let it be assumed that the part 4 now under analysis by the optic system 43 of FIG. 6 contains a dimple having a center 10' that is offset as shown on FIG. 3. This being the case, computer 64, since it has already computed and identified the location of the actual center 10' of the dimple 2, now determines a y' and x' offset for the center of the dimple. This represents the amount by which the actual dimple is offset in an x and y direction from the location the dimple would be in if it met the design objectives. This y' and x' information is stored in computer 64 for subsequent use.

Next, table 48 and tool holder 51 are moved to the left horizontally so that video optics system 43 and lens 56 scan head 1. The optic system 43 scans the rectangular head 1 by sequentially scanning and identifying, the upper left hand corner, the lower left hand corner, the upper right hand corner and the lower right hand corner. Having scanned the four corners, and having been advised by its preprogrammed software that head 1 is a rectangle, computer 64 now computes the location of the center CG of the top surface of head 1. The controller also uses the computed information regarding location of the lower left hand and lower right hand corners of head 1 to characterize a line representing the lower side 18 (FIG. 1) of the head. Side 18 should ideally be parallel to the horizontal reference of the table but, in practice, will normally be offset therefrom by an angular amount of theta 2. This information regarding side 18 tells computer 64 the angular position in which head 1 currently rests on tool 51.

Next, arm 34 is moved to the left by element 47. Z axis servo motor 39 is now actuated by computer 64 so that screw 41 is turned in the manner required to lower element 38A until the bottom surface of element 36 is adjacent the top surface of head 1. At this time, vacuum valve 49A is actuated by computer 64 so that the vacuum created at the lower end of element 36 lifts head 1 and holds it affixed to the bottom surface of element 36. Servo motor 38 is now actuated to raise arm 34 and head 1. Arm element 34 is then moved with head 1 to the right under control of air cylinder 50C. Next, table 48 is rotated by the angular amount of theta 1 minus theta 2 so that the x axis of arm 9 is made parallel to the lower end 18 of head 1. Next, computer translates x' and y' information representing the offset of the situs 10' of the center of dimple 2. Table 48 is moved this amount to align the center 10' of dimple 2 so that it will be under the center of head 1 when arm 34 and head 1 is subsequently moved to the left.

Next, the vision system 43 remeasures the circular dimple to ascertain that the center 10' of the dimple is in the correct position on the table. If it is not, the table is moved in the required x and y manner to reposition the tool holder so that the center 10' of the dimple is in the required location. Next, arm 34 is moved to the left by cylinder 50C. Since the bottom surface of element 36 of arm 34 currently holds head 1 attached thereto by means of the vacuum from source 49, the center CG of the head is at this time immediately over the center 10' of dimple 2. Next, servo motor 39 is actuated to lower arm 34 and projection 36 the required amount so that the bottom surface of head 1 contacts the flexure 3 and adhesive 15 that has been priorly placed on flexure 3. The apparatus of FIGS. 6 and 7 is left in this position for a brief interval during which heater 46 is actuated by computer 64 to apply heat upwards to the bottom of dimple 2. This heats dimple 2 and causes the adhesive to assume a sufficient set to hold head 1 accurately in the position in which it has been placed by the apparatus of FIGS. 6 and 7. The vacuum source 49 is then deactivated, apparatus 38A is raised, and element 34 is moved to the right. Tool holder 51 now contains arm 9 and flexure 3 onto which head 1 has been accurately placed and bonded thereto by the heat cured adhesive 15.

The following describes in further detail the computer controlled video optics system shown in FIGS. 4, 5, 6 and 7. This system comprises the entirety of the apparatus shown on FIG. 6 with the exception of the vacuum source 49, the vacuum valve 49a, the air source 50, the air valve 50a, the tool holder 51, and the suspension arm 9 and head 1 mounted on tool holder 51. The remainder of the apparatus of FIG. 6 comprises what is herein referred to as the computer controlled video optics system. This system is commercially available from the POLYCHECK Corporation as Model No. 9978-001-01-SP. The address of the POLYCHECK Corporation is OSI, 4281 Technology Drive, Fremont, Calif. 94538. The operation of this system is controlled by computer 64 which includes the hardware and software required to effect the required system operations and functions.

The software of computer 64 is provided by the POLYCHECK Corporation under the above identified model number. This software is of the menu driven type in that it responds to a plurality of different commands with each command being associated with a different system function. These commands are listed in the manual that accompanies the computer controlled video optics system. Each command is associated with a different system function and the transmission of the command to the computer together with coordinate information causes the system to perform the associated system function. The disclosed computer controlled video optics system performs the various operations associated with the method of the present invention in response to the reception of a plurality of system commands arranged in the sequence required to effect the method of the present invention.

Figure 8:
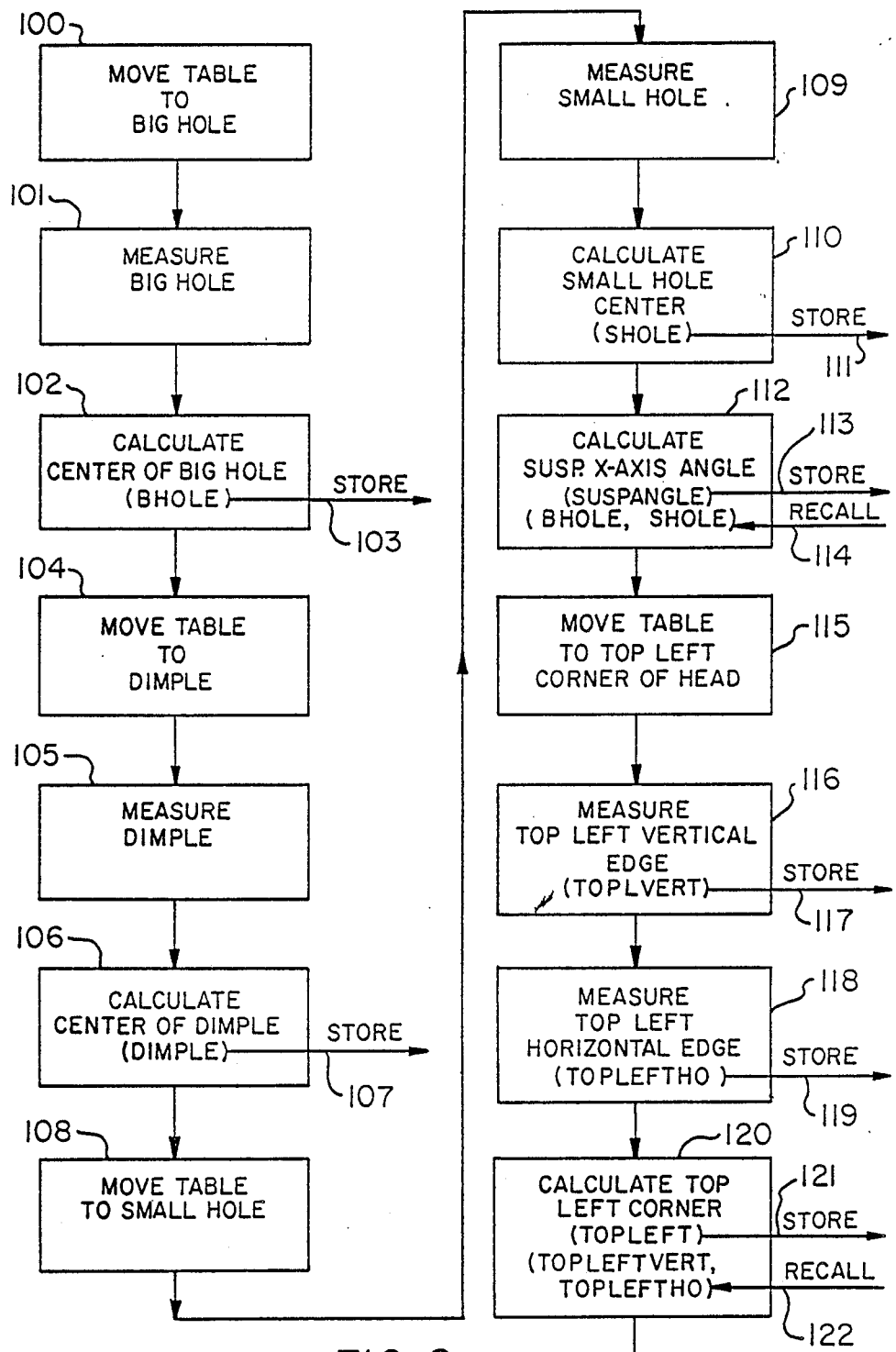
Figure 9:
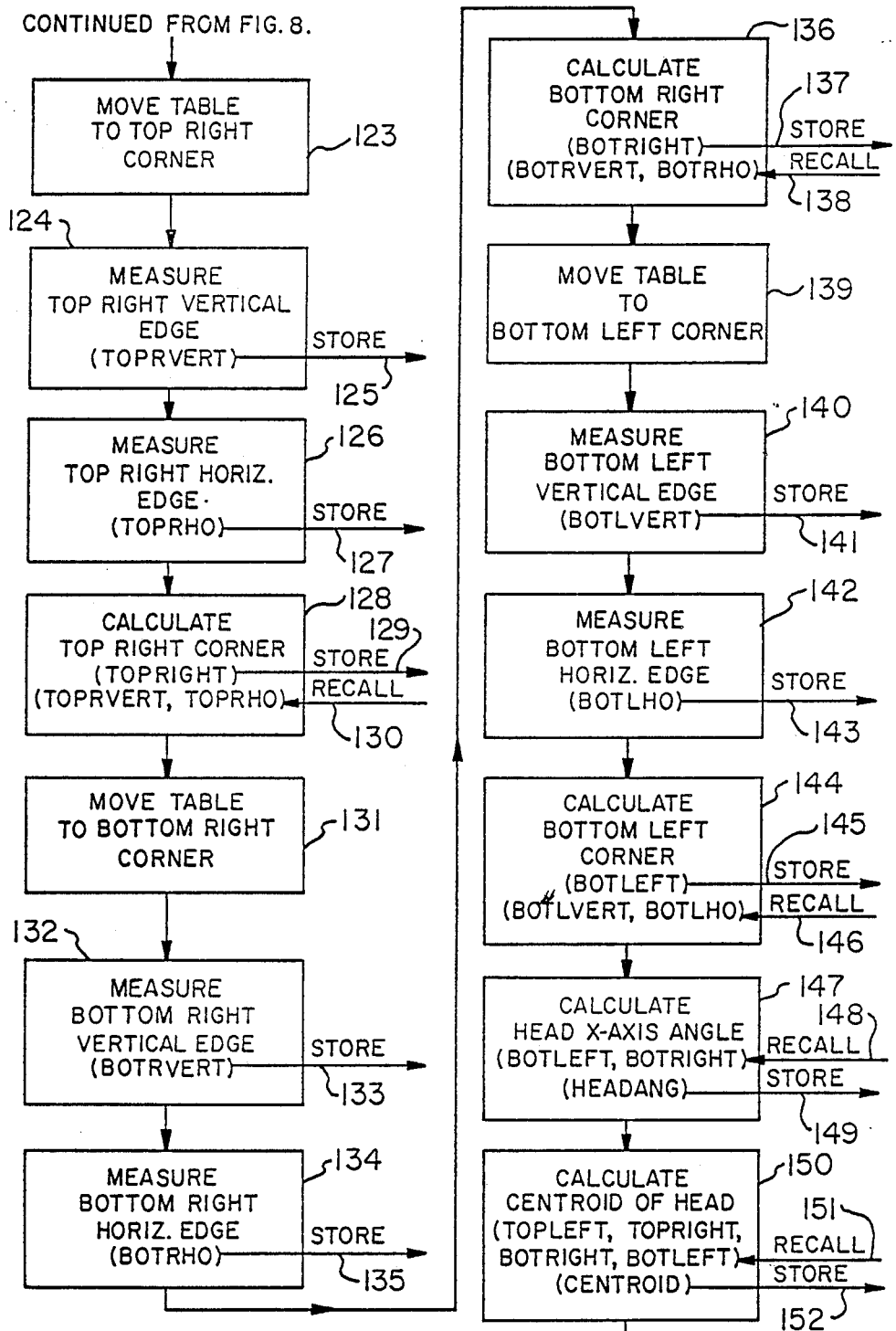
Figure 10:
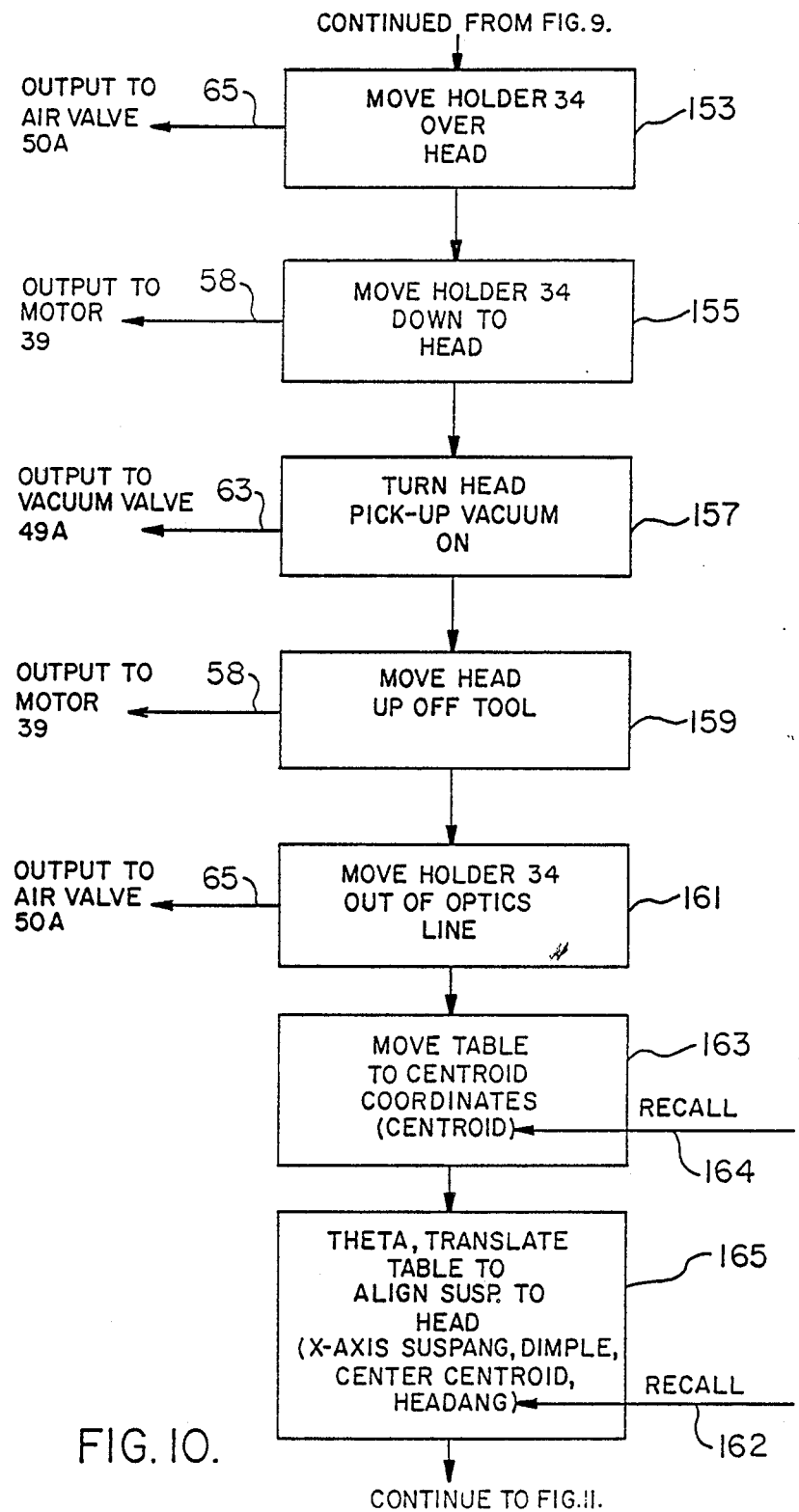

The following describes the sequence of commands that are transmitted to the menu driven computer controlled video optics system to cause it to perform the plurality of sequential steps that are required to practice the method of the present invention. This sequence of commands is shown in detail on FIGS. 8 through 11. The process begins on the top of FIG. 8 following the placement of tool holder 51 within the confines of posts 26 and 27 on the top of table 48. The process begins with element 100 in which computer 64 is commanded to move table 48 so that the video optics apparatus 43 and lens 56 can scan the big hole 6 on arm 9 as shown on FIG. 1. The process then moves to element 101 which commands the computer to measure the big hole. In measuring the big hole, the video optics apparatus 43 scans a plurality of segments of the circumference of hole 6. The process next moves to element 102 which commands the computer 64 to calculate situs of the center of the big hole. This calculation is performed using the information derived by element 101. The coordinates representing the situs of the center of the big hole are stored in memory in address BHOLE. This information is shown as being entered into memory via path 103.

The process advances to element 104 which transmits a move command to computer 64 to cause table 48 to move leftwards to the position in which video optics 43 and lens 56 scan the dimple 2. Next, element 105 causes the optics system 43 to measure dimple 2. This is done by identifying at least two segments of the circumference of the dimple. Next, the process advances to element 106 in which a calculate command is transmitted to computer 64 to cause it to calculate the situs of the center 10 (FIG. 1) of dimple 2. Element 105 scans the dimple and segments of its circumference. Element 106 uses the information derived by element 105 to calculate the situs of the center of dimple 2. This situs information is transmitted over path 106 and stored in memory in an address referred to as DIMPLE. In element 108, table 48 is moved by computer 64, motion controller 44, and motor 54 to the position in which video optics system 43 can scan the small hole 7 of FIG. 1. The process next advances to element 109 which causes optics system 43 and computer 64 to measure small hole 7 by scanning segments of its circumference. Element 110 uses the information derived by element 109 to calculate the situs of the center of the small hole. This situs information is transmitted over path 111 to computer 64 and stored in memory location SHOLE. The process then advances to element 112 which calculates the angular amount by the which the x axis of suspension arm 9 is offset with regard to an imaginary horizontal reference line on table 48. Element 112 performs this function by receiving the coordinate information for the big hole and the small hole over path 114. It uses this information to define the x axis which is an imaginary line interconnecting the centers of these two holes. It then uses the x axis information to derive the angular information indicating the angular amount by which the x axis of arm 9 deviates from being parallel to the reference horizontal line of the table. This angular information is transmitted path 113 and stored in memory location SUSPANGLE.

Next, element 115 causes the table to move to the left so that optic system 43 can scan the top left corner of head 1 of FIG. 1. Information identifying the top left corner of head 1 is derived by elements 116, 118 and 120. Element 116 causes optic system 43 to scan and identify the location of the top left vertical edge 19 of the head. This information is transmitted over path 117 to memory and stored in location TOPLVERT. Element 118 causes the optic system to identify the situs of the top left horizontal edge 17 of the head. This information is transmitted over path 119 to the memory of computer 64 and stored in memory location TOPLEFTHO. Element 120 receives over path 122 the information derived by elements 116 and 118 and derives coordinate information identifying the situs of the top left corner 12 of the head. This coordinate information transmitted over path 121 to memory and stored in location TOPLEFT.

At this stage of the process, the coordinates of the situs of the top left corner 12 of head 1 has been identified and stored in memory of computer 64. Next, element 123 moves table 48 to a position in which video optics 43 can scan the top right corner area 13 of head 1. Information identifying the situs of this corner is derived by elements 124, 126 and 128. Element 124 causes the system to measure the situs of the top right vertical edge 21 of head 1. This situs information is stored in memory location TOPRVERT via path 125. Next element 126 causes the system to measure and identify the situs of the top right horizontal edge 17 of head 1. This situs information is stored in memory location TOPRHO via path 127. Element 128 receives the information derived by elements 124 and 126 over path 130 and calculates the coordinates of the situs of the top right corner 13 of head 1. This situs information is stored in memory location TOPRIGHT via path 129.

Next, element 131 moves table 48 to the position in which video optics 43 can scan the bottom right corner 16 area of head to derive information regarding the situs of the bottom right corner. This information is derived by elements 132, 134 and 136. Element 132 causes the system to identify any situs of the bottom right vertical edge 21 of the head. This information is stored in memory location BOTRVERT via path 133. Element 134 causes the system to measure the situs of the bottom right horizontal edge 18 of head 1. This information is stored in memory location BOTRHO via path 135. Element 136 receives over path 138 the information derived by elements 132 and 134 and calculates the situs of the bottom right corner 16 of head 1. This situs information is stored in memory location BOTRIGHT via path 137.

Next, table 48 is caused by element 139 to move to the position in which video optic system 43 can scan the general area of the bottom left corner 14 of head 1. Information pertaining to this corner is derived by elements 140, 142 and 144. Element 140 causes the system to derive information regarding the situs of the bottom left vertical edge 19 of head 1. This information is stored in memory location BOTLVERT via path 141.

Element 142 causes the system to derive information regarding the situs of the bottom left horizontal edge 18 of head 1. This information is stored in memory location BOTLHO via path 143. Element 144 receives over path 146 the information derived by elements 140 and 142 and calculates the situs of the bottom left corner 14 of head 1. This information entered into memory location BOTLEFT via path 145. Next, element 147 causes the system to derive information indicating the angular amount by which the x axis of the head is offset from being parallel with respect to the horizontal reference line of table 48. Element 147 performs its function by receiving information over path 148 identifying the coordinates of the bottom left and bottom right corners 14 and 16 of head 1. It then defines a line interconnecting these two corners. Because of accurate machining of the head in its fabrication, this line is presumed to be parallel to the x axis of the head shown on FIG. 1. Element 147 uses this information and the information regarding the horizontal reference line of table 48 to derive the information indicating the angular amount by which the x axis of the head is offset from parallel with the horizontal reference line of the table. This angular information is transmitted over path 149 and stored in memory location HEADANG.

Next, element 150 calculates the coordinates of the center cg of head 1 as shown on FIG. 1. It does this by first receiving over path 151 information identifying the coordinates of the four corners of the head. It uses this information to calculate the coordinates of the center cg of the head. This information is stored in memory location CENTROID via path 152.

Next, element 153 causes the system to activate air valve 50A so that holder 34 is moved to the left and positioned over head 1. This action is accomplished via path 65 which, as shown on FIG. 6, extends from computer 64 to air valve 50A and which causes the air valve to assume the operative position in which holder 34 is moved to the left by cylinder 50C. Element 155 causes the system to actuate motor 39 of FIG. 6 to move the bottom projection 36 of element 34 downwards as shown on FIG. 5 so that it is immediately adjacent the top surface of head 1. This action is accomplished by computer 64 applying a signal to path 58 to cause motor 39 to turn element 41 in the direction required to lower element 34. Element 157 activates vacuum valve 49A to cause the bottom projection 36 of element 34 to pick up head 1. This action is accomplished when computer 64 applies a signal to path 63 to actuate vacuum valve 49a so that vacuum may be extended via vacuum line 49B on FIG. 5 to produce a vacuum at the bottom surface of element 36. This picks up head 1 and firmly affixes it to the bottom surface of element 36.

Element 159 causes head 1 and element 36 to be moved upwards and away from tool 51. This action is accomplished when computer 64 applies the signal required over path 58 to cause motor 39 to move apparatus 38A and elements 34 and 36 upward. Element 161 causes the system to move holder 34 and its projection 36 and head 1 to the right so that it is out of the view of lens 56 and optic system 43. This action is accomplished by computer 64 applying the signal required to line 65 to close air valve 50A so that elements 50D, 45, 34 and 36, together with head 1, move to the right as shown on FIG. 5. At this time, head 1 has been picked up by the bottom surface of element 36, moved upwards away from tool 51 and then moved to the right so that it is out of the line of vision of lens 56 and video optics 43.

Next, element 163 receives over path 164 from memory the coordinates of the center cg of head 1. Element 163 causes table 48 to be moved to the location in which the center of dimple 2 is in the general vicinity of the coordinates representing the situs of the center cg of head 1 prior to the time the head was picked up by element 36. Next element 165 causes the system to derive the information required to align the suspension arm 9 so that its x axis is parallel to the x axis of head 1. It achieves this function by receiving information over path 162 identifying the angle of the x axis of suspension arm 9, the coordinates of the center of the dimple, the coordinates of the center of the head 1, and the angle by which the x axis of the head is offset from parallel with the horizontal reference line of the table. After having received the information over path 162, element 165 causes the system compute the amount by which table 48 should be rotated so that the x axis of arm 9 is parallel with the x axis of head 1 which is now attached to the bottom surface of element 36. Element 165 also causes motor 54 to move table 48 as required so that the center of dimple 2 is at the same coordinate position as the computed center cg of head 1 prior to the time it was moved by element 36.

Next, element 166 causes the system to scan the dimple again to compute the coordinates of the current situs of the center of dimple 2. This information is stored in memory location FINALDIMPLE via path 167. Element 168 receives the information derived by element 167 and causes the table 48 to be moved so that the center of dimple 2 is moved to the correct coordinates. This moves tool 51 to the position in which the center of dimple 2 is in the same position as was the center cg of head 1 prior to the time that head 1 was picked up and moved away by the vacuum at the bottom of element 36. Next, element 170 causes holder 34 and its element 36 and head 1 to move back to the left so that the center cg of the head is over the center 10 of the dimple. This action is accomplished by applying a signal from computer 64 over path 65 to actuate the air valve 50A and cylinder 50C. Next, element 172 causes head 1 to be lowered until it contacts flexure 3 with the center cg of the head being at the same table coordinates as is the center 10 of dimple 2. This action is accomplished by the computer 64 applying the signal required to path 58 to cause motor 39 to lower apparatus 38A including elements 34 and 36. At this time, head 1 is contacting the flexure 3 and glue 15 with the center cg of head 1 being immediately over the center of the dimple and with the x axis of the head being parallel to the x axis of suspension arm 9.

Next, element 175 causes the heater 46 to be activated for the period of time required to cause the drops of glue 15 on FIG. 1 to bond head permanently to flexure 3. This action is accomplished when the computer 64 transmits a signal over path 59 to activate the heater. The heater is subsequently deactivated by the same path after the expiration of the time required to bond adhesive 15. Element 176 deactivates vacuum valve 49A so that the head 1 is no longer held to the bottom surface of element 36. This is accomplished when computer 64 transmits the signal required over path 63 to turn of vacuum valve 49A so that a vacuum no longer exists at the bottom surface of element 36. Finally, element 177 causes the system to transmit a signal from computer 64 over path 58 to operate motor 39 so that it raises apparatus 38A and holder 34 and element 36 upwards to its initial position in which it is spaced apart vertically from head 1 which is now permanently affixed to flexure 3 of arm 9 in a precise alignment with respect to all perameters.

It can thus be seen, that the method of the present invention provides means of easily and accurately positioning a recording head on a suspension assembly arm.

While preferred embodiments of the present invention have been shown, it is to be expressly understood that modifications and changes may be made thereto and that the present invention is set forth in the following claims.

I claim:

1. Apparatus for mounting a magnetic read/write head onto a suspension assembly arm having mounting identification indicia comprising a dimple, said arm having adhesive applied thereto adjacent said dimple, said apparatus comprising;
   means for determining the location of the center of said dimple on said arm,
   means for determining the location of the center of said head,
   means for rotating said arm in a horizontal plane so that a longitudinal axis of said head is parallel to a longitudinal axis of said arm,
   means for positioning said arm so that said center of said head is immediately over said center of said dimple,
   means for lowering said head onto said arm while said center of said head remains over said center of said dimple, and
   means for permanently affixing said head to said dimple by applying heat to a bottom of said dimple for the time required to heat said dimple and said arm to bond said adhesive.

2. Apparatus including a computer controlled optics system for mounting a rectangular recording head onto a suspension assembly arm having mounting identification indicia thereon with said indicia comprising an inner circular hole and an circular outer hole and a circular dimple intermediate said holes, said arm having adhesive applied thereto adjacent said dimple, said apparatus comprising;
   a tool for holding said arm and said head in a spaced apart relationship,
   means including said computer controlled optics system for determining the location of the center of said first hole on said arm by scanning perimeter segments of the circumference of said first hole,
   means including said computer controlled optics system for determining the location of the center of said second hole on said arm by scanning perimeter segments of the circumference of said second hole,
   means including said computer controlled optics system for determining the location of the center of said dimple on said arm by scanning perimeter segments of the circumference of said dimple,
   means including said computer controlled optics system for defining an imaginary line on said arm interconnecting said centers of said holes,
   means including said computer controlled optics system for determining an offset representing the distance between said center of said dimple and a predetermined location on said line,
   means including said computer controlled optics system for determining the location of the center of said head by scanning the corners of said rectangular head,
   means including said computer controlled optics system for rotating a table on which said arm rests in a horizontal plane so that a side of said head is parallel to said line on said arm,
   means including said computer controlled optics system for positioning said arm so that said center of said head is immediately over said center of said dimple,
   means including said computer controlled optics system for applying a vacuum to a holder,
   means including said computer controlled optics system for moving said holder atop said head so that said head is lifted upwards by said vacuum and held against a bottom surface of said holder,
   means including said computer controlled optics system for moving said head and said holder upwards away from said tool,
   means including said computer controlled optics system for moving said head and said holder horizontally away from said tool,
   means including said computer controlled optics system for determining the current location of the center of said dimple by scanning said perimeter segments of said circumference of said dimple,
   means including said computer controlled optics system for moving said tool a required amount to position said dimple in a precise location required for said center of said dimple to receive said center of said head,
   means including said computer controlled optics system for moving said holder and said head horizontally to position said center of said head over said center of said dimple,
   means including said computer controlled optics system for lowering said holder so that said head is placed onto said arm while said center of said head remains immediately over said center of said dimple,
   means including said computer controlled optics system for applying heat to a bottom of said dimple to heat said dimple and said arm for the time required to bond said adhesive and permanently affix said head to said arm, and
   means including said computer controlled optics system for removing said vacuum to release said head from said holder.

3. The apparatus of claim 1 wherein said indicia further comprises a first area and a second area on said arm with said dimple being positioned on said arm intermediate said areas, said apparatus further comprising;
   means for determining the location of the center of said first area on said arm,
   means for determining the location of the center of said second area on said arm, and
   means for defining said longitudinal axis of said arm to be an imaginary line interconnecting said centers of said areas.

4. The apparatus of claim 3 wherein said means for identifying said center of said dimple comprises;
   means for determining an offset for said dimple by determining the amount by which the location of said dimple on said arm is spaced apart on said arm from a predetermined location on said longitudinal axis of said arm, and
   means for using said offset determination to position said center of said head over said center of said dimple.

5. The apparatus of claim 4 wherein said head is affixed to said dimple by the application of heat to said dimple for a duration of time required to cure said adhesive so that said head remains rigidly attached to said arm after said heat is removed.

6. An apparatus for mounting a rectangular magnetic recording head onto a suspension assembly arm having mounting identification indicia comprising an inner hole and an outer hole and a dimple intermediate said holes, said arm having adhesive applied thereto adjacent said dimple, said apparatus comprising:

means for determining the location of the center of said first hole on said arm, means for determining the location of the center of said second hole on said arm, means for determining the location of the center of said dimple on said arm, means for defining a longitudinal axis of said arm to be an imaginary line interconnecting the centers of said holes, means for determining an offset representing the distance between said center of said dimple and a predetermined location on said line, means for determining location of the center of said head, means for rotating said arm in a horizontal plane so that a side of said head is parallel to said line of said arm, means for positioning said arm so that said center of said head is immediately over said center of said dimple while keeping said side of said head parallel to said line of said arm, means for lowering said head onto said arm while said center of said head remains over said center of said dimple, and means for permanently affixing said head to said arm by means of said adhesive.

7. The apparatus of claim 6 wherein said head is affixed to said arm by the application of heat to said dimple for a duration of time required to cure said adhesive so that said head remains rigidly attached to said arm after said heat is removed.

8. An apparatus for mounting a rectangular recording head onto a suspension assembly arm having mounting identification indicia comprising an inner hole and an outer hole and a dimple intermediate said holes, said arm having adhesive applied thereto adjacent said dimple, said apparatus comprising:

means for placing said arm and said head in separate locations of a holding tool, means for determining the location of the center of said first hole on said arm, means for determining the location of the center of said second hole on said arm, means for determining the location of the center of said dimple on said arm, means for defining an imaginary line on said arm interconnecting the centers of said holes, means for determining an offset representing the distance between said center of said dimple and a predetermined location on said line, means for applying a vacuum to a holder, means for moving said holder atop said head so that said head is lifted upwards by said vacuum and held against a bottom portion of said holder, means for moving said head and said holder upwards away from said tool, means for determining the location of the center of said head, means for rotating said arm in a horizontal plane so that a side of said head is parallel to said line on said arm, means for using said offset determination to position said arm so that said center of said dimple is positioned to receive said center of said head while keeping said side of said head parallel to said line on said arm, means for redetermining the current location of the center of said dimple, means for moving said tool a required amount to position said dimple in a precise location required for said center of said dimple to receive said center of said head, means for moving said holder and said head to position said center of said head over said center of said dimple, means for lowering said holder so that said head is placed onto said arm while said center of said head remains immediately over said center of said dimple, means for permanently affixing said head to said dimple by means of said adhesive, and means for removing said vacuum to release said head from said holder.

9. The apparatus of claim 8 wherein said head is affixed to said arm by the application of heat to said dimple for a duration of time required to cure said adhesive so that said head remains rigidly attached to said arm after said heat is removed.

* * * * *